(12) United States Patent
Brovko et al.

(10) Patent No.: US 6,888,490 B1
(45) Date of Patent: May 3, 2005

(54) SPATIAL MULTIBEAM AMBIGUITY RESOLVING TECHNIQUE (SMART)

(75) Inventors: Oleg Brovko, Los Angeles, CA (US); Eric Wayne Day, Lomita, CA (US); Trung T. Nguyen, Huntington Beach, CA (US); Jing Zhao, Moreno Valley, CA (US); Mark S. Klemens, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/894,792

(22) Filed: Jul. 20, 2004

(51) Int. Cl.[7] .............................. G01S 13/90
(52) U.S. Cl. ................ 342/25 A; 342/25 R; 342/25 F
(58) Field of Search ........................ 342/25 R, 25 A, 342/25 F

(56) References Cited

U.S. PATENT DOCUMENTS

| | | | | |
|---|---|---|---|---|
| 4,771,287 A | * | 9/1988 | Mims ...................... | 342/25 R |
| 4,853,699 A | * | 8/1989 | Easton .................... | 342/25 R |
| 5,343,204 A | * | 8/1994 | Farmer et al. ............ | 342/25 R |
| 6,130,641 A | * | 10/2000 | Kraeutner et al. ........ | 342/25 A |
| 2004/0150547 A1 | * | 8/2004 | Suess et al. .............. | 342/25 A |

* cited by examiner

Primary Examiner—Ian J. Lobo
(74) Attorney, Agent, or Firm—Leonard A. Alkov; Karl A. Vick

(57) ABSTRACT

A synthetic aperture radar (SAR) image of a wide coverage area is acquired during a frame containing a first plurality of ambiguities induced in the SAR image from radar scatterers within the area. The area is illuminated with radar pulses and a segmented receive antenna oriented towards the area. The segmented receive antenna has a second plurality of sub-apertures, where the second plurality of sub-apertures is larger than the first plurality of ambiguities. Each sub-aperture has its own receiver. The digital stream from each receiver is stored in a computer for the duration of the frame to obtain frame data. A SAR image is extracted from the frame data. The first plurality of ambiguities are identified from analysis of the frame data, and a correction is computed to account for the first plurality of ambiguities contained within the synthetic aperture image. The correction is applied to reduce distortions caused by the ambiguities in the SAR image.

4 Claims, 2 Drawing Sheets ately small
SPATIAL MULTIBEAM AMBIGUITY RESOLVING TECHNIQUE (SMART)

BACKGROUND OF THE INVENTION

1. Field of the Invention

This invention is in the field of Synthetic Aperture Radar (SAR) imaging using a plurality of receive channels of a segmented antenna to identify and compensate for ambiguities in wide coverage SAR images.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform.

The plurality of returns creating a SAR image generated by the transmitted pulses along a known path of the platform make up a frame length. During the frame length, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the frame length.

The plurality of pulses transmitted during an SAR frame length, when coherently combined and processed, result in image quality comparable to a longer antenna, corresponding approximately to the "length" traveled by the antenna during the frame length.

Range target resolution in SAR images is determined by the radar bandwidth. Range resolution is inversely proportional to radar bandwidth. That is, the higher the bandwidth, the smaller the details of a radar scatterer can be discerned in a range bin. Therefore, ideally, radar imaging is best enhanced by short pulses of high peak power.

It is desirable to produce a SAR image covering as much of an area as possible in one frame length. Unfortunately, both for spotlight and side looking, swath SAR modes, there is an inherent constraint in the size of the area that can be acquired in one frame length. If the frame is too long in the range direction, or too wide in the cross range direction, or both, ambiguities will arise in the imaging process. That is, because of the processing involved, certain scatterers will appear in more than one location in the final SAR image. This ghost like superposition on the real image tends to degrade the actual image, affecting its clarity thereby limiting its utility.

SUMMARY OF THE INVENTION

Above limitation is avoided by a method for acquiring a synthetic aperture image of an area during a frame, said synthetic aperture radar (SAR) image containing a first plurality of ambiguities. Said ambiguities are induced in the SAR image from radar scatterers within said area. Said SAR image has range/azimuth pixels, and is acquired with a radar system on a moving platform for the duration of said frame.

The method comprises the steps of:

transmitting radar pulses for illuminating said area for the duration of said frame, said area reflecting a radar return;

receiving said radar return using a segmented receive antenna oriented towards said area, said segmented receive antenna having a second plurality of sub-apertures said second plurality of sub-apertures larger than said first plurality of ambiguities;

connecting each of said sub-apertures to a radar receiver, said second plurality of sub-apertures receiving radar returns from said area, each of said radar receivers generating a digital stream, said digital stream representative of said radar return received at one of said sub-apertures during said frame;

storing said digital stream from each receiver in a computer for the duration of said frame to obtain frame data;

computing said synthetic aperture image from said frame data;

identifying said first plurality of ambiguities from analysis of said frame data;

computing a correction for said first plurality of ambiguities contained within said synthetic aperture image;

applying said correction to reduce distortions caused by said first plurality of ambiguities on said synthetic aperture image of said area.

Specifically, in mathematical notation, $\overline{Y}$ is said range/azimuth SAR pixel computed from said frame data generated by one or more of said second plurality of antenna sub-apertures;

$\vec{G}_1, \vec{G}_2, \ldots \vec{G}_N$ are complex vectors of spatial channel gain associated with said second plurality sub apertures, said receivers and a path from said radar scatterers to each of said sub-apertures;

$\alpha_1, \alpha_2, \ldots \alpha_N$'s are said radar scatterer cross sections ambiguously contributing to one of said range/azimuth pixel of said SAR image;

$\vec{n}$ are a receiver/antenna/target noise in each of said sub-apertures;

said computing step comprising a least square fit to said frame data by solving $$[\vec{Y} - \hat{\alpha}_1 \vec{G}_1 - \alpha_2 \vec{G}_2 - \ldots - \hat{\alpha}_N \vec{G}_N][\vec{Y} - \hat{\alpha}_1 \vec{G}_1 - \alpha_2 \vec{G}_2 - \ldots - \hat{\alpha}_N \vec{G}_N]^* = \vec{n} \cdot \vec{n}^*$$

to identify said $\alpha_1, \alpha_2, \ldots \alpha_n$ from (2)

$$\begin{pmatrix} \hat{a}_1 \\ \hat{a}_2 \\ \vdots \\ \hat{a}_N \end{pmatrix} = \begin{pmatrix} 1 & \frac{\vec{G}_1^* \cdot \vec{G}_2}{\vec{G}_1 \cdot \vec{G}_1^*} & \frac{\vec{G}_1^* \cdot \vec{G}_3}{\vec{G}_1 \cdot \vec{G}_1^*} & \cdots & \frac{\vec{G}_1^* \cdot \vec{G}_N}{\vec{G}_1 \cdot \vec{G}_1^*} \\ \frac{\vec{G}_2^* \cdot \vec{G}_1}{\vec{G}_2 \cdot \vec{G}_2^*} & 1 & \frac{\vec{G}_2^* \cdot \vec{G}_3}{\vec{G}_2 \cdot \vec{G}_2^*} & \cdots & \frac{\vec{G}_2^* \cdot \vec{G}_N}{\vec{G}_2 \cdot \vec{G}_2^*} \\ \frac{\vec{G}_3^* \cdot \vec{G}_1}{\vec{G}_3 \cdot \vec{G}_3^*} & \frac{\vec{G}_3^* \cdot \vec{G}_2}{\vec{G}_3 \cdot \vec{G}_3^*} & 1 & \ddots & \vdots \\ \vdots & \vdots & \ddots & \ddots & \frac{\vec{G}_{N-1}^* \cdot \vec{G}_N}{\vec{G}_{N-1} \cdot \vec{G}_{N-1}^*} \\ \frac{\vec{G}_N^* \cdot \vec{G}_1}{\vec{G}_N \cdot \vec{G}_N^*} & \frac{\vec{G}_N^* \cdot \vec{G}_2}{\vec{G}_N \cdot \vec{G}_N^*} & \cdots & \frac{\vec{G}_N^* \cdot \vec{G}_{N-1}}{\vec{G}_N \cdot \vec{G}_N^*} & 1 \end{pmatrix}^{-1} \cdot \begin{pmatrix} \frac{\vec{Y} \cdot \vec{G}_1^*}{\vec{G}_1 \cdot \vec{G}_1^*} \\ \frac{\vec{Y} \cdot \vec{G}_2^*}{\vec{G}_2 \cdot \vec{G}_2^*} \\ \vdots \\ \frac{\vec{Y} \cdot \vec{G}_N^*}{\vec{G}_N \cdot \vec{G}_N^*} \end{pmatrix}$$

DETAILED DESCRIPTION OF THE INVENTION

The present invention describes an apparatus and method for improving a SAR image due to ambiguities acquired because of wide area coverage.

Figure 1:
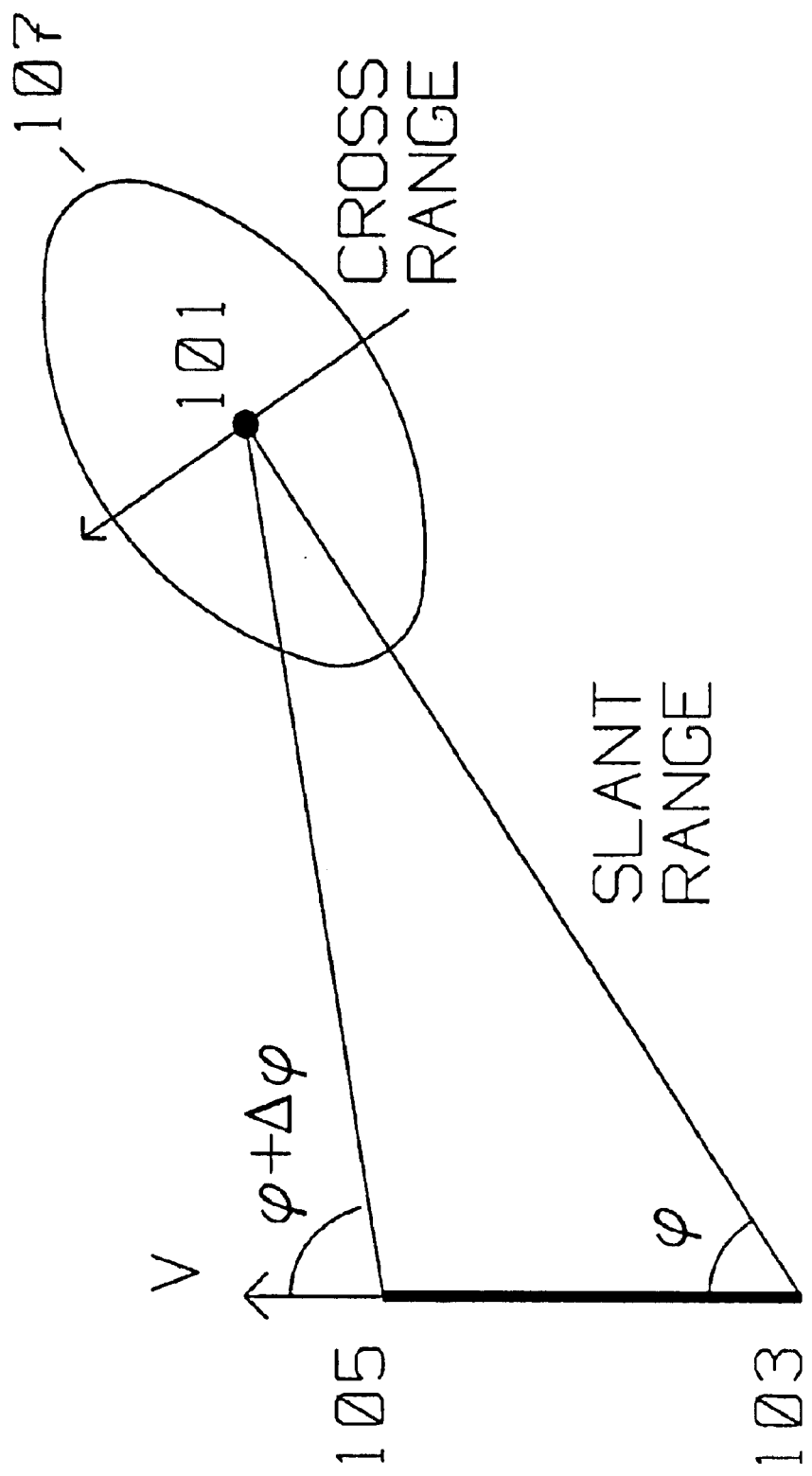
FIG. 1 is a SAR spotlight configuration of the prior art.

FIG. 1 shows the typical prior art geometric relationship between a moving platform carrying a radar transmitter/receiver using Synthetic Aperture (SAR) spotlight methods and target area 101 to be imaged by said radar transmitter/receiver. The moving platform is initially at position 103, travels with velocity V in the direction shown to position 105. In SAR spotlight mode, the SAR antenna is actively oriented towards scatterer 101 as the platform moves with respect to scatterer 101 with velocity V. The moving platform moves from position 103 to position 105, while adjusting the side looking angle from $\phi$ to $\phi+\Delta\phi$ for spotlight mode so that the antenna keeps illuminating target area 101. Antenna illumination with radar energy covers area 107 during a frame length, and includes target area 101. Similarly, the antenna receive pattern covers area 107, and includes target area 101. Radar pulses are transmitted and corresponding returns received at many points during the frame length between position 103 and position 105. SAR radar is well known in the art and described by W. Carrara, et al, in *Spotlight Synthetic Aperture Radar*, Artech house, 1995, incorporated herein be reference in its entirety.

In the prior art, as detailed in High Resolution Radar, by Donald R. Wehner, Artech House, ISBN 0-089006-194-7, in spotlight mode, slant range resolution is $$\frac{c}{2n\Delta f}$$

The size of area 107 is limited by slant range ambiguity. This ambiguity is defined by $$\frac{c}{2\Delta f} \quad (PA1)$$

Similarly, cross range ambiguity length is $$\frac{R\lambda}{2nT_2 v_p \sin\phi} \quad (PA2)$$

where c is the speed of light;

n number of pulses in a burst;

$\Delta f$ is frequency step size;

R is range to scatterer in vicinity of target 101;

$\lambda$ is wavelength of the radar operating frequency;

$T_2$ is pulse repetition interval (PRI);

$v_p$ is phase delay for frequency error;

$\phi$ is azimuth angle at start of frame, $\phi+\Delta\phi$ is angle at end of frame, assuming SAR spotlight operation.

Above equations compute the area covered by the radar antenna transmit/receive pattern, such as area 107. If greater coverage is attempted, by beam spoiling or the like, azimuth/range ambiguities are introduced in the imaging of scatterers within area 107.

The result of increasing area covered beyond that computed in equations PA1 and PA2 above are blurred SAR images. This is a marked problem at close range where a typical antenna pattern covers a relatively small region resulting in low SAR area coverage. One option, using beam spoiling to make SAR antenna coverage wider, results in lowered transmit and receive antenna gain, thus lower clutter to noise ratio (CNR), reducing SAR map quality. The other option, reducing PRF, affects negatively the Clutter to noise ratio as less average power is available for SAR imaging.

The present invention avoids above ambiguity problem and those of related spoiled beam/reduced PRF approaches and facilitates wide area coverage for SAR images. By forming multiple receive beams, in the limit, one receive beam oriented at each SAR image pixel, the CNR loss due to receive beam spoiling can be reduced and higher CNR can be achieved.

Figure 2:
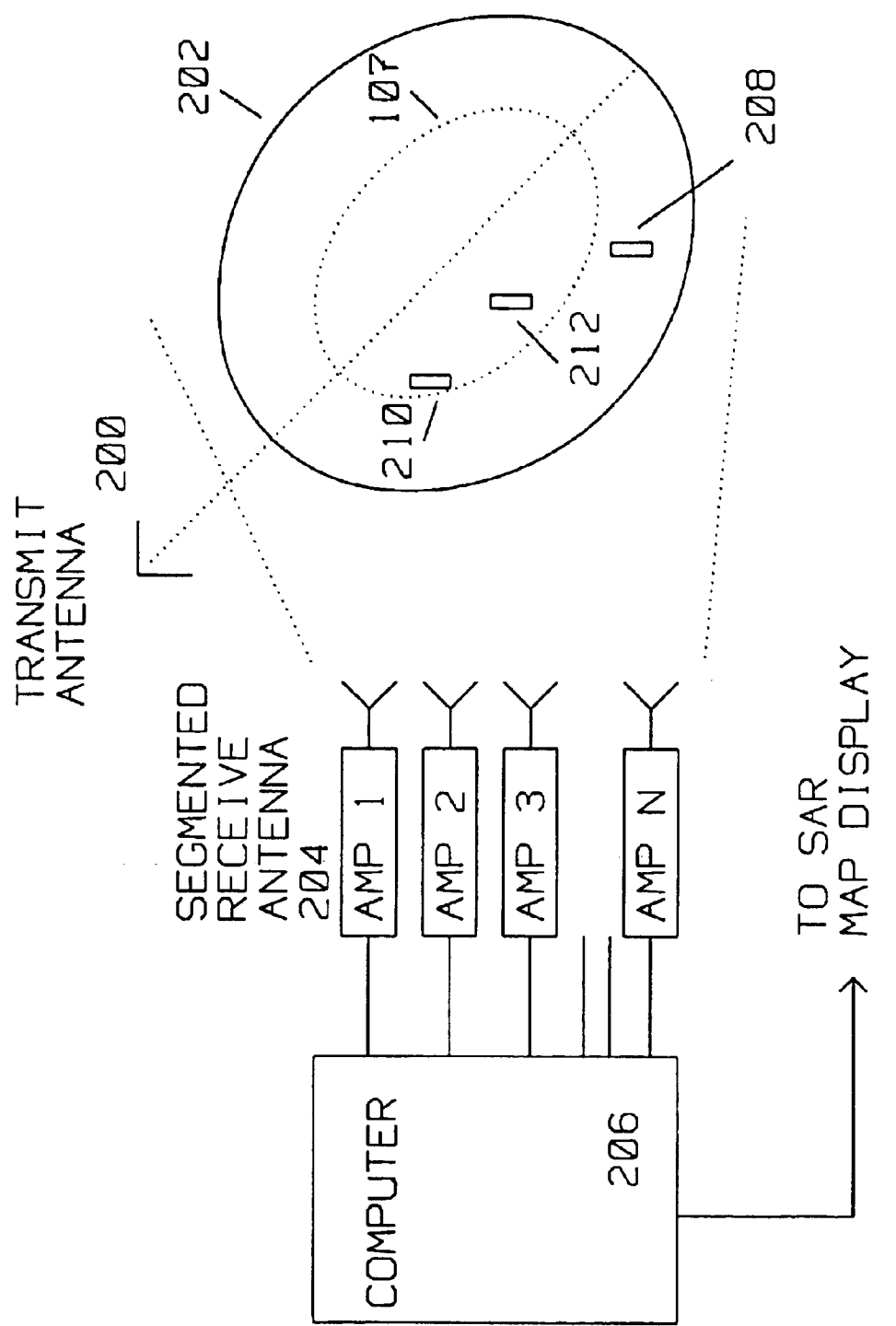
FIG. 2 is a SAR spotlight configuration using multiple receive channels in a segmented antenna using the method of this invention.

Shown in FIG. 2 is a radar system of the present invention for acquiring a synthetic aperture image of an area 202. Area 202 is a wide coverage area, larger than typical area coverage 107. The synthetic aperture images derived form area 202 contain a first plurality of ambiguities from scatterers (targets) such as 208, 210 and 212. The radar system is on a moving platform. Radar transmitter and transmit antenna 200 illuminates area 202. Area 202 reflects a radar return into a segmented receive antenna 204 oriented towards area 202. The segmented receive antenna 204 has a second plurality of sub-apertures 1, 2, 3 . . . N. This second plurality of sub-apertures 1, 2, 3 . . . N is larger than the first plurality of ambiguities present in the radar image. Each receive sub-aperture has larger coverage area than the original receive antenna because each sub-aperture has a smaller physical extent than the original receive antenna.

A second plurality of radar receivers AMP1, AMP2, AMP3 . . . AMP N is connected to each of said second plurality of sub-apertures for receiving radar returns from area 202. Each of the radar receivers AMP1, AMP2, AMP3, . . . AMP N generates a digital stream. Each of the digital streams from each radar receiver AMP1, AMP2, AMP3 . . . AMP N is representative of the radar return received at one (of the second plurality) of the sub-apertures.

The digital streams are transmitted to computer 206 for storing and processing. Computer 206 generates a correction from the second plurality of digital streams sent by radar receivers AMPS, AMP2, AMP3 . . . AMP N. This correction corrects the blurring of the synthetic aperture image of area 202 caused by the first plurality of ambiguities from targets 208, 210 and 212.

The output from computer 206 is a SAR display. The equation for the radar return in an image pixel from all receivers connected to different receive sub-apertures is given by equation (1)

$$\vec{Y} = \alpha_1 \vec{G}_1 + \alpha_2 \vec{G}_2 + \ldots + \alpha_N \vec{G}_N + \vec{n} \quad (1)$$

where $\vec{Y}$ is a specific range/azimuth SAR pixel composed of information derived from different spatial channels (antenna sub-apertures);

$\vec{G}_1, \vec{G}_2, \ldots \vec{G}_N$ are complex vectors of spatial channel gain associated with AMP1, AMP2, AMP3 . . . AMP N.

$\alpha$'s are scatterer/ambiguity cross sections related to scatterer 208, 212, 210 ambiguously contributing to a particular range/azimuth pixel of the SAR image.

1 . . . . N is the second plurality of sub apertures of the receive antenna gain;

$\vec{n}$ is the receiver/antenna/target noise in each spatial channel.

$\vec{Y}$ is obtained using typical SAR image processing, as detailed in FIG. 2, for example performing the steps of:

1) Transmit a series of bursts of narrow band pulses to illuminate area 202 for the duration of a frame, where each pulse is generally frequency coded for subsequent pulse compression.

2) Collect I and Q samples of the echo responses received from the radar illuminated area over the frame from a plurality of receive antenna sub-apertures, each aperture connected to its own amplification/digitization channel, each of the sub apertures oriented towards area 202.

3) Store I and Q samples for the area for pulses within a frame yielding a complex quantity, I+jQ.

4) Apply weighting, motion compensation, corrections for phase and amplitude ripple, sampling bias and imbalance errors to each I+jQ sample from each channel corresponding to each sub aperture.

5) Compute an inverse discrete Fourier Transform (DFT$^{-1}$) of I+jQ samples covering the area.

6) Extract SAR image pixels descriptive of the area from DFT$^{-1}$ results, the pixels descriptive of radar scatterers within the area.

One condition of this invention is that the number of spatial channels is larger than the number of ambiguities present in the area covered by the SAR image.

A least square fit of the data to the antenna gain pattern is performed with the estimates, $\hat{\alpha}$ of ground reflectivity in the ambiguous direction by solving:

$$[\vec{Y} - \hat{\alpha}_1 \vec{G}_1 - \alpha_2 \vec{G}_2 - \ldots - \vec{\alpha}_N \vec{G}_N] [\vec{Y} - \hat{\alpha}_1 \vec{G}_1 - \alpha_2 \vec{G}_2 - \ldots - \vec{\alpha}_N \vec{G}_N]^* = \vec{n} \cdot \vec{n}^* \quad (2)$$

using the same definitions for variables as in equation 1 above, and $\vec{n}$ is receiver/path/target noise, assumed independent from receive channel to receive channel.

$\hat{\alpha}_1 \ldots \hat{\alpha}_N$'s are the ground reflectivity, or target cross section(s), contributing to a pixel in the SAR image in the ambiguous direction(s).

The solution to equation 2, is expressed by equation 3, using the same variables as in equation 1 and 2.

$$\begin{pmatrix} \hat{\alpha}_1 \\ \hat{\alpha}_2 \\ \vdots \\ \hat{\alpha}_N \end{pmatrix} = \begin{pmatrix} 1 & \frac{\vec{G}_1^* \cdot \vec{G}_2}{\vec{G}_1 \cdot \vec{G}_1^*} & \frac{\vec{G}_1^* \cdot \vec{G}_3}{\vec{G}_1 \cdot \vec{G}_1^*} & \cdots & \frac{\vec{G}_1^* \cdot \vec{G}_N}{\vec{G}_1 \cdot \vec{G}_1^*} \\ \frac{\vec{G}_2^* \cdot \vec{G}_1}{\vec{G}_2 \cdot \vec{G}_2^*} & 1 & \frac{\vec{G}_2^* \cdot \vec{G}_3}{\vec{G}_2 \cdot \vec{G}_2^*} & \cdots & \frac{\vec{G}_2^* \cdot \vec{G}_N}{\vec{G}_2 \cdot \vec{G}_2^*} \\ \frac{\vec{G}_3^* \cdot \vec{G}_1}{\vec{G}_3 \cdot \vec{G}_3^*} & \frac{\vec{G}_3^* \cdot \vec{G}_2}{\vec{G}_3 \cdot \vec{G}_3^*} & 1 & \ddots & \vdots \\ \vdots & \vdots & \ddots & \ddots & \frac{\vec{G}_{N-1}^* \cdot \vec{G}_N}{\vec{G}_{N-1} \cdot \vec{G}_{N-1}^*} \\ \frac{\vec{G}_N^* \cdot \vec{G}_1}{\vec{G}_N \cdot \vec{G}_N^*} & \frac{\vec{G}_N^* \cdot \vec{G}_2}{\vec{G}_N \cdot \vec{G}_N^*} & \cdots & \frac{\vec{G}_N^* \cdot \vec{G}_{N-1}}{\vec{G}_N \cdot \vec{G}_N^*} & 1 \end{pmatrix}^{-1} \quad (3)$$

$$\begin{pmatrix} \dfrac{\vec{Y} \cdot \vec{G}_1^*}{\vec{G}_1 \cdot \vec{G}_1^*} \\ \dfrac{\vec{Y} \cdot \vec{G}_2^*}{\vec{G}_2 \cdot \vec{G}_2^*} \\ \vdots \\ \dfrac{\vec{Y} \cdot \vec{G}_N^*}{\vec{G}_N \cdot \vec{G}_N^*} \end{pmatrix}$$

Once the $\hat{\alpha}_1, \hat{\alpha}_2 \ldots \hat{\alpha}_N$ are extracted as shown by above equations, the related SAR image is corrected for the effect of the ambiguities.

All references cited in this document are incorporated herein in their entirety by reference.

Although presented in exemplary fashion employing specific embodiments, the disclosed structures are not intended to be so limited.

Those skilled in the art will also appreciate that numerous changes and modifications could be made to the embodiment described herein without departing in any way from the invention.

What is claimed is:

1. A radar system for acquiring a synthetic aperture image of an area during a frame, said synthetic aperture image containing a first plurality of ambiguities, said ambiguities from radar scatterers within said area, said radar system on a moving platform for the duration of said frame, said radar comprising:
   a radar transmitter and transmit antenna for illuminating said area for the duration of said frame, said area reflecting a radar return;
   a segmented receive antenna oriented towards said area, said segmented receive antenna having a second plurality of sub-apertures said second plurality of sub-apertures larger than said first plurality of ambiguities;
   each of said sub-apertures connected to a receiver, said second plurality of sub-apertures receiving radar returns from said area, each of said receivers generating a digital stream, said digital stream representative of said radar return received at one of said sub-apertures;
   a computer for storing said digital stream from each receiver for the duration of said frame to obtain frame data, said computer extracting said synthetic aperture image from said frame data received by said second plurality of sub-apertures;
   said computer identifying said first plurality of ambiguities from said frame data;
   said computer computing a correction for said-first plurality of ambiguities, said computer using said correction to reduce distortions caused by said first plurality of ambiguities on said synthetic aperture image of said area.

2. A radar system as described in claim 1 wherein
$\vec{Y}$ is a range/azimuth synthetic aperture pixel computed from said frame data generated by one or more of said second plurality, of antenna sub-apertures;

$\vec{G}_1, \vec{G}_2, \ldots \vec{G}_N$ are complex vectors of spatial channel gain associated with said second plurality sub apertures, said receivers and a path from said radar scatterers to each of said sub-apertures;

$\alpha_1, \alpha_2, \ldots \alpha_N$'s are said radar scatterer cross sections ambiguously contributing to one of said range/azimuth pixel of said SAR image;

$\vec{n}$ are a receiver/antenna/target noise in each of said sub-apertures;

said computer computing a least square fit to said frame data by solving:

$$[\vec{Y} - \hat{\alpha}_1 \vec{G}_1 - \alpha_2 \vec{G}_2 - \ldots - \vec{\alpha}_N \vec{G}_N][\vec{Y} - \hat{\alpha}_1 \vec{G}_1 - \alpha_2 \vec{G}_2 - \ldots - \vec{\alpha}_N \vec{G}_N]^* = \vec{n} \cdot \vec{n}^*$$

to identify said $\alpha_1, \alpha_2, \ldots \alpha_N$ from $$\begin{pmatrix} \hat{\alpha}_1 \\ \hat{\alpha}_2 \\ \vdots \\ \hat{\alpha}_N \end{pmatrix} = \begin{pmatrix} 1 & \dfrac{\vec{G}_1^* \cdot \vec{G}_2}{\vec{G}_1 \cdot \vec{G}_1^*} & \dfrac{\vec{G}_1^* \cdot \vec{G}_3}{\vec{G}_1 \cdot \vec{G}_1^*} & \ldots & \dfrac{\vec{G}_1^* \cdot \vec{G}_N}{\vec{G}_1 \cdot \vec{G}_1^*} \\ \dfrac{\vec{G}_2^* \cdot \vec{G}_1}{\vec{G}_2 \cdot \vec{G}_2^*} & 1 & \dfrac{\vec{G}_2^* \cdot \vec{G}_3}{\vec{G}_2 \cdot \vec{G}_2^*} & \ldots & \dfrac{\vec{G}_2^* \cdot \vec{G}_N}{\vec{G}_2 \cdot \vec{G}_2^*} \\ \dfrac{\vec{G}_3^* \cdot \vec{G}_1}{\vec{G}_3 \cdot \vec{G}_3^*} & \dfrac{\vec{G}_3^* \cdot \vec{G}_2}{\vec{G}_3 \cdot \vec{G}_3^*} & 1 & \ddots & \vdots \\ \vdots & \vdots & \ddots & \ddots & \dfrac{\vec{G}_{N-1}^* \cdot \vec{G}_N}{\vec{G}_{N-1} \cdot \vec{G}_{N-1}^*} \\ \dfrac{\vec{G}_N^* \cdot \vec{G}_1}{\vec{G}_N \cdot \vec{G}_N^*} & \dfrac{\vec{G}_N^* \cdot \vec{G}_2}{\vec{G}_N \cdot \vec{G}_N^*} & \ldots & \dfrac{\vec{G}_N^* \cdot \vec{G}_{N-1}}{\vec{G}_N \cdot \vec{G}_N^*} & 1 \end{pmatrix}^{-1}$$

$$\begin{pmatrix} \dfrac{\vec{Y} \cdot \vec{G}_1^*}{\vec{G}_1 \cdot \vec{G}_1^*} \\ \dfrac{\vec{Y} \cdot \vec{G}_2^*}{\vec{G}_2 \cdot \vec{G}_2^*} \\ \vdots \\ \dfrac{\vec{Y} \cdot \vec{G}_N^*}{\vec{G}_N \cdot \vec{G}_N^*} \end{pmatrix}.$$

3. A method for acquiring a synthetic aperture image of an area during a frame, said synthetic aperture image containing a first plurality of ambiguities, said ambiguities from radar scatterers within said area, said synthetic aperture image having range azimuth pixels, said synthetic aperture image acquired with a radar system on a moving platform for the duration of said frame, said method comprising the steps of:
   transmitting radar pulses for illuminating said area for the duration of said frame, said area reflecting a radar return;
   receiving said radar return using a segmented receive antenna oriented towards said area, said segmented receive antenna having a second plurality of sub-apertures said second plurality of sub-apertures larger than said first plurality of ambiguities;

connecting each of said sub-apertures to a radar receiver, said second plurality of sub-apertures receiving radar returns from said area, each of said radar receivers generating a digital stream, said digital stream representative of said radar return received at one of said sub-apertures during said frame;

storing said digital stream from each receiver in a computer for the duration of said frame to obtain frame data;

computing said synthetic aperture image from said frame data;

identifying said first plurality of ambiguities from analysis of said frame data;

computing a correction for said first plurality of ambiguities contained within said synthetic aperture image;

applying said correction to reduce distortions caused by said first plurality of ambiguities on said synthetic aperture image of said area.

4. A method as described in claim 3 wherein $\vec{Y}$ is said range/azimuth synthetic aperture image pixel computed from said frame data generated by one or more of said second plurality of antenna sub-apertures $\vec{G}_1, \vec{G}_2, \ldots \vec{G}_N$ are complex vectors of spatial channel gain associated with said second plurality sub apertures, said receivers and a path from said radar scatterers to each of said sub-apertures;

$\alpha_1, \alpha_2, \alpha_N$'s are said radar scatterer cross sections ambiguously contributing to one of said range/azimuth pixel of said SAR image;

$\vec{n}$ are a receiver/antenna/target noise in each of said sub-apertures;

said computing step comprising a least square fit to said frame data by solving $$[\vec{Y}-\hat{\alpha}_1\vec{G}_1-\alpha_2\vec{G}_2-\ldots-\vec{\alpha}_N\vec{G}_N][\vec{Y}-\hat{\alpha}_1\vec{G}_1-\alpha_2\vec{G}_2-\ldots-\vec{\alpha}_N\vec{G}_N]^* = \vec{n}\cdot\vec{n}^*$$

to identify said $\alpha_1, \alpha_2, \alpha_N$ from $$\begin{pmatrix}\hat{\alpha}_1 \\ \hat{\alpha}_2 \\ \vdots \\ \hat{\alpha}_N\end{pmatrix} = \begin{pmatrix} 1 & \frac{\vec{G}_1^*\cdot\vec{G}_2}{\vec{G}_1\cdot\vec{G}_1^*} & \frac{\vec{G}_1^*\cdot\vec{G}_3}{\vec{G}_1\cdot\vec{G}_1^*} & \cdots & \frac{\vec{G}_1^*\cdot\vec{G}_N}{\vec{G}_1\cdot\vec{G}_1^*} \\ \frac{\vec{G}_2^*\cdot\vec{G}_1}{\vec{G}_2\cdot\vec{G}_2^*} & 1 & \frac{\vec{G}_2^*\cdot\vec{G}_3}{\vec{G}_2\cdot\vec{G}_2^*} & \cdots & \frac{\vec{G}_2^*\cdot\vec{G}_N}{\vec{G}_2\cdot\vec{G}_2^*} \\ \frac{\vec{G}_3^*\cdot\vec{G}_1}{\vec{G}_3\cdot\vec{G}_3^*} & \frac{\vec{G}_3^*\cdot\vec{G}_2}{\vec{G}_3\cdot\vec{G}_3^*} & 1 & \ddots & \vdots \\ \vdots & \vdots & \ddots & \ddots & \frac{\vec{G}_{N-1}^*\cdot\vec{G}_N}{\vec{G}_{N-1}\cdot\vec{G}_{N-1}^*} \\ \frac{\vec{G}_N^*\cdot\vec{G}_1}{\vec{G}_N\cdot\vec{G}_N^*} & \frac{\vec{G}_N^*\cdot\vec{G}_2}{\vec{G}_N\cdot\vec{G}_N^*} & \cdots & \frac{\vec{G}_N^*\cdot\vec{G}_{N-1}}{\vec{G}_N\cdot\vec{G}_N^*} & 1 \end{pmatrix}^{-1} \begin{pmatrix} \frac{\vec{Y}\cdot\vec{G}_1^*}{\vec{G}_1\cdot\vec{G}_1^*} \\ \frac{\vec{Y}\cdot\vec{G}_2^*}{\vec{G}_2\cdot\vec{G}_2^*} \\ \vdots \\ \frac{\vec{Y}\cdot\vec{G}_N^*}{\vec{G}_N\cdot\vec{G}_N^*} \end{pmatrix}.$$

\* \* \* \* \*